Nov. 16, 1948. A. DE MEO 2,454,041
REINFORCED PLASTIC SECURING MEANS IN A
FRAME FOR INTERCHANGEABLE HAND MIRRORS
Filed Dec. 8, 1945

INVENTOR
ATTILIO DE MEO
BY
ATTORNEY

Patented Nov. 16, 1948

2,454,041

UNITED STATES PATENT OFFICE 2,454,041

REINFORCED PLASTIC SECURING MEANS IN A FRAME FOR INTERCHANGEABLE HAND MIRRORS

Attilio De Meo, New York, N. Y.

Application December 8, 1945, Serial No. 633,583

2 Claims. (Cl. 88—101)

This invention relates in general to a mirror, and in particular to an interchangeable hand mirror.

It is a purpose of the invention to provide a hand mirror of an attractive design and having a replaceable viewing means.

It is a further object of the invention to provide a hand mirror having a removable and interchangeable reflecting glass.

It is an additional object of the invention to provide a combination interchangeable hand mirror with a plurality of interchangeable viewing means.

Further objects of the invention as well as its use, construction and operation will in part be obvious and will in part appear hereinafter.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
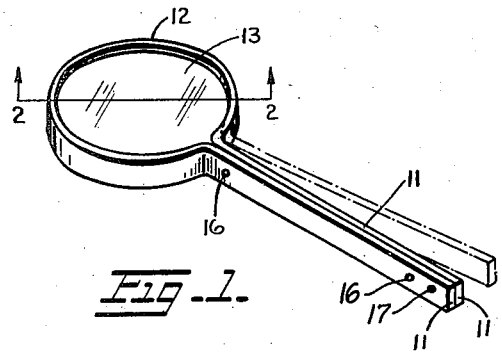
Figure 1 is a perspective view of a mirror according to one form of the invention.

Referring to the figures in detail there is shown in Figs. 1 to 4 a hand mirror generally designated 10 comprising an integral handle 11 and frame 12, with a viewing glass 13 carried in the frame. The frame and the enclosed viewing member may be any suitable shape such as, round, square, oval, or the like. Alternatively the viewing member may be an irregular, decorative shape, thereby adding to the attractiveness of the design. In the form shown in the figure, the frame is shown for the purposes of simplicity of design as a simple frame member of regular thickness, although it is to be understood that the frame may be irregular in thickness and may have a design either printed on the surface thereof or formed on the member by raised or sunken portions.

The handle member 11 comprises two longitudinal members 11ª and 11ᵇ which lie parallel with one another and which at the frame end of the handle separate from one another to form the frame 12 which surrounds the viewing member. The handle, like the frame 12, is shown as a simple straight member 11, but it is to be understood that the handle may likewise have a decorative design or shape. Likewise, it is understood that the handle may be provided with a curved or other irregular structure to fit more firmly in the hand.

The handle and the frame are formed of a suitable, somewhat flexible material such as a flexible metal, a flexible wood, a plastic or other natural or synthetic resin. In the presently preferred form of the invention, the handle and frame are formed of a transparent plastic material such as, the plastic commonly marketed under the name "lucite."

It is further understood that the handle and the frame may be of two different materials, in which case the frame is one of the materials enumerated above, whereas the handle is selected from the same materials with the addition of non-flexible materials such as brittle plastics, cast metals and the like.

The viewing member 13 may be any suitable and conventional mirror member such as, a silver-backed glass, a polished metal plate or other polished surface. The selection of the material will be in accordance with the particular needs and to conform with a desired design. However, for most purposes it is understood that a silver backed glass will be used for this purpose, and accordingly the word glass will be used in the specification and the claims to denote both a glass member and such other mirror-like members which may be used in the art.

Figure 2:
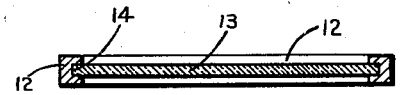
Fig. 2 is a sectional view of the article shown in Fig. 1, taken along the line 2—2.

Fig. 2 shows the structure of the frame member 12 and the conformity therewith of the glass 13. The inner surface of the frame is of substantially the same shape as the outer edge of the glass 13 and is slightly smaller than the glass. Along the inner surface and extending therearound is a groove 14 of substantially the same width as the glass and adapted to receive the glass. Thus, the glass is received in and retained by the groove in the inner surface of the frame.

The glass is removably mounted in the frame by separating the handle members 11ª and 11ᵇ as shown by the dotted outline in Fig. 1. In this position the area of the frame member is enlarged so that the glass may be inserted therein or removed therefrom. When the glass is in position, it is secured there by closing the handle members together and fastening them to one another by means of screws 16 or the like.

Figure 3:
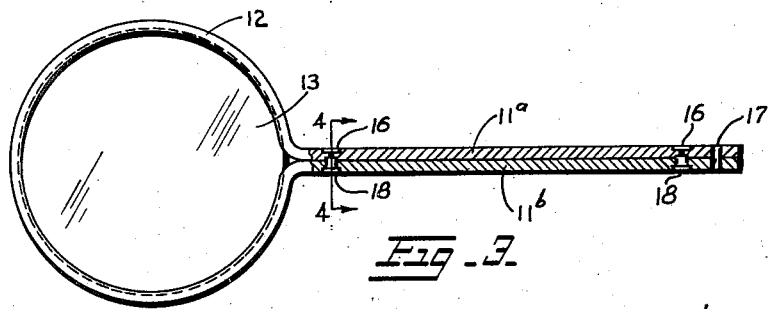
Fig. 3 is a top plan view of the article shown in the previous figures with the handle of the mirror partially in section.
Figure 4:
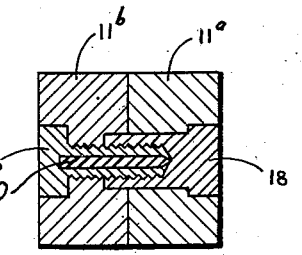
Fig. 4 is a sectional view of the article shown in Fig. 3, taken along the line 4—4.

This securing formation of the handle and frame is shown in further detail in Figs. 3 and 4 wherein may be seen the position of the screws 16 within the handle 11. In this view there is also shown a mounting hole 17 by means of which the mirror may be placed on a hook or nail while not in use.

In Fig. 4 there is shown in detail the structure of the handle members 11a and 11b where the screw 16 is secured therein. According to this structure the one handle member 11a has a small tough insert 18 to receive the screw. This insert may terminate flush with the inner surface of the handle member 11a, or alternatively it may extend therefrom to project into a recess in the other handle member 11b. In the figure, this latter formation is shown, and it has the advantage that the snug fit of the insert within the recess additionally secures the handle members in their correct position relative to one another. The screw 16 is adapted to be screwed into the insert 18, thus firmly fixing the mounting.

The screw and the insert, or either one of them may be constructed of metal or other similar durable material. However, in the preferred form of the invention these are of transparent plastic material like the handle and frame members, and the only metal or similar rigid structural material is a metal insert 20 molded within the body of the screw 16, serving to prevent longitudinal stretching of the screw. The joint thus formed is attractive in design and appearance and firm in structure.

Figure 5:
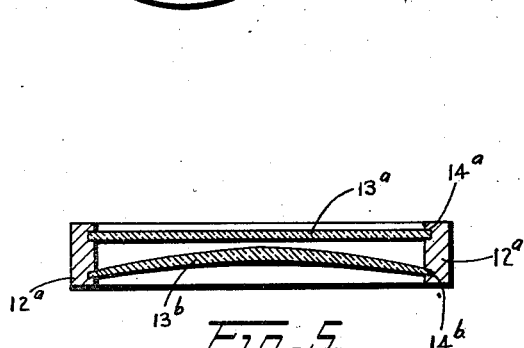
Fig. 5 is a sectional view of a combination mirror according to another form of the invention, the view being taken along a line similar to that of Fig. 2.

In Fig. 5 is shown a frame 12a having a plurality of grooves 14a and 14b, in which are set a plurality of glasses 13a and 13b. In this form of the invention it is understood that the various glasses may be plane, concave, or convex as desired. Likewise they may be clear and uncolored in design, or alternatively may be of various colors or designs. For example, in the embodiment shown in Fig. 5 the one glass 13a is plane, whereas the other glass 13b is concave on its outer surface and convex on its inner surface. Thus the assembled mirror comprises a plane-concave mirror assembly, and by removing the plane glass 13a, this mirror may be converted into a concave-convex mirror, or by reversing the glass 13b, this mirror may be converted to a plane-convex mirror. In this form of the invention, the curved mirror 13b is either silvered on both sides, or alternatively, as shown in the figure, is a thin, curved polished metal sheet.

Figure 6:
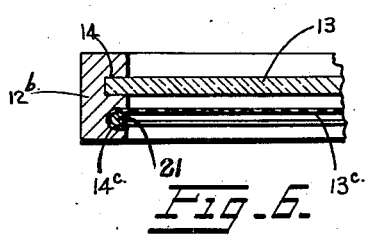
Fig. 6 is a fragmentary sectional view of a frame and glass member according to a still further form of the invention.

In addition to the form shown and described in connection with Fig. 5, at least one of the glasses may be colored or designed. In Fig. 6 there is further shown a frame 12b having a glass 13 and a thin transparent sheet 13c which suitably is a colored transparent film or a film bearing a decorative design. The film is mounted in groove 14c by means of a wire ring 21 or the like fitting within the groove and securing the film in position.

The article described herein is an attractive mirror assembly which is particularly designed for use in beauty shops as well as in private boudoirs, and is an economical, attractive item. The plastic frame particularly described is attractive and durable, and receives replacement glasses when the glass is broken by accident, thus avoiding an expensive replacement of an entire mirror. The variable design features permit a frequent change of design, so that a beauty shop operator may change the design of the mirror periodically and thereby avoid monotony of appearance.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an article of the class described having a split frame encircling a viewing member and continuing on opposite sides of the split into parallel longitudinal handle members in facial contact with each other, means for securing the handle members together so as to hold the split frame in a position rigidly encircling the viewing member, comprising an internally threaded insert of resinous plastic material extended through an opening formed in one of the handle members and extended into a complementary aligned recess formed in the other of the handle members, the other handle member being formed with a threaded opening continuing from said recess and of a size corresponding to the internal thread of said insert and in axial alignment with the internal thread of said insert, a screw of resinous plastic material threadedly engaged with the threaded opening of the other handle and the internal thread of said insert, said screw being formed with a recess extended in from its inner end, and means within the recess of said screw reinforcing said screw against longitudinal stretching.

2. In an article of the class described having a split frame encircling a viewing member and continuing on opposite sides of the split into parallel longitudinal handle members in facial contact with each other, means for securing the handle members together so as to hold the split frame in a position rigidly encircling the viewing member, comprising an internally threaded insert of resinous plastic material extended through an opening formed in one of the handle members and extended into a complementary aligned recess formed in the other of the handle members, the other handle member being formed with a threaded opening continuing from said recess and of a size corresponding to the internal thread of said insert and in axial alignment with the internal thread of said insert, a screw of resinous plastic material threadedly engaged with the threaded opening of the other handle and the internal thread of said insert, said screw being formed with a recess extended in from its inner end, and means within the recess of said screw reinforcing said screw against longitudinal stretching, said latter-mentioned means comprising a metal insert molded into the recess of said screw.

ATTILIO DE MEO.

REFERENCES CITED

The following references are of record in the file of this patent:

UNITED STATES PATENTS

| Number | Name | Date |
| --- | --- | --- |
| 251,060 | Miles | Dec. 20, 1881 |
| 610,518 | Bausch | Sept. 13, 1898 |
| 792,251 | Debacher | June 13, 1905 |
| 793,309 | Liebmann | June 27, 1905 |
| 1,127,013 | Kahn | Feb. 2, 1915 |
| 2,058,703 | Malivert | Oct. 27, 1936 |
| 2,067,751 | Beegle | Jan. 12, 1937 |
| 2,120,834 | Donaldson | June 14, 1938 |
| 2,324,049 | Winslow | July 13, 1943 |
| 2,352,819 | Winslow | July 4, 1944 |
| 2,352,820 | Winslow | July 4, 1944 |

FOREIGN PATENTS

| Number | Country | Date |
| --- | --- | --- |
| 9,498 | Great Britain | 1897 |